(12) United States Patent  
Takimoto et al.

(10) Patent No.: US 7,770,684 B2
(45) Date of Patent: Aug. 10, 2010

(54) AIRBAG DEVICE FOR PEDESTRIAN

(75) Inventors: Takayuki Takimoto, Tokyo (JP); Hiroyuki Takahashi, Aichi (JP)

(73) Assignee: Takata Corporation, Tokyo (JP)

( * ) Notice: Subject to any disclaimer, the term of this patent is extended or adjusted under 35 U.S.C. 154(b) by 145 days.

(21) Appl. No.: 12/087,570

(22) PCT Filed: Jan. 9, 2007

(86) PCT No.: PCT/JP2007/050081

§ 371 (c)(1),
(2), (4) Date: Jul. 10, 2008

(87) PCT Pub. No.: WO2007/086246

PCT Pub. Date: Aug. 2, 2007

(65) Prior Publication Data

US 2008/0314672 A1 Dec. 25, 2008

(30) Foreign Application Priority Data

Jan. 25, 2006 (JP) .............................. 2006-016322

(51) Int. Cl.
*B60R 21/34* (2006.01)
(52) U.S. Cl. .................................................. 180/274
(58) Field of Classification Search ............... 180/274; 280/728.2, 728.3; 296/192
See application file for complete search history.

(56) References Cited

U.S. PATENT DOCUMENTS

| 4,355,843 | A  | * | 10/1982 | Murakami | .................. 296/201 |
|---|---|---|---|---|---|
| 6,923,286 | B2 | * | 8/2005 | Sato et al. | .................... 180/274 |
| 7,243,754 | B2 | * | 7/2007 | Mori et al. | ................... 180/274 |
| 7,404,597 | B2 | * | 7/2008 | Romig | ........................ 296/213 |
| 2003/0062208 | A1 | * | 4/2003 | Hamada et al. | ............. 180/274 |
| 2003/0159875 | A1 | * | 8/2003 | Sato et al. | .................... 180/274 |
| 2005/0205333 | A1 | * | 9/2005 | Mori et al. | .................... 180/274 |
| 2007/0052215 | A1 | * | 3/2007 | Miyata | .................... 280/730.1 |
| 2007/0052217 | A1 | * | 3/2007 | Miyata | .................... 280/730.1 |
| 2007/0085306 | A1 | * | 4/2007 | Miyata | .................... 280/728.2 |
| 2009/0001691 | A1 | * | 1/2009 | Takimoto et al. | ......... 280/728.1 |

FOREIGN PATENT DOCUMENTS

| JP | 3245489 | 10/2001 |
|---|---|---|
| JP | 2003-104144 | 4/2003 |
| JP | 2003-252145 | 9/2003 |
| JP | 2005-178587 | 7/2005 |
| JP | 2005-262954 | 9/2005 |
| JP | 2005-349954 | 12/2005 |

OTHER PUBLICATIONS

Machine Translation of JP 2005-349954 (foreign reference cited by Applicant).*
Machine Translation of JP 3245489 [also published as H07-125609] (foreign reference cited by Applicant).*

* cited by examiner

*Primary Examiner*—Paul N Dickson
*Assistant Examiner*—Joseph Rocca
(74) *Attorney, Agent, or Firm*—Manabu Kanesaka

(57) ABSTRACT

An airbag device 4 for pedestrian structured to drain water in a case to a cowl includes a case 8 for storing an airbag 5 in a folded state, an inflator 9 for inflating the airbag 5, and a lid 10 which closes an opening 3a of a hood 3, which allows passage of the airbag. Discharge passages 9 for draining water which has intruded into the case 8 to a cowl louver 2 are formed at both ends of the case 8 in a longitudinal direction.

6 Claims, 4 Drawing Sheets

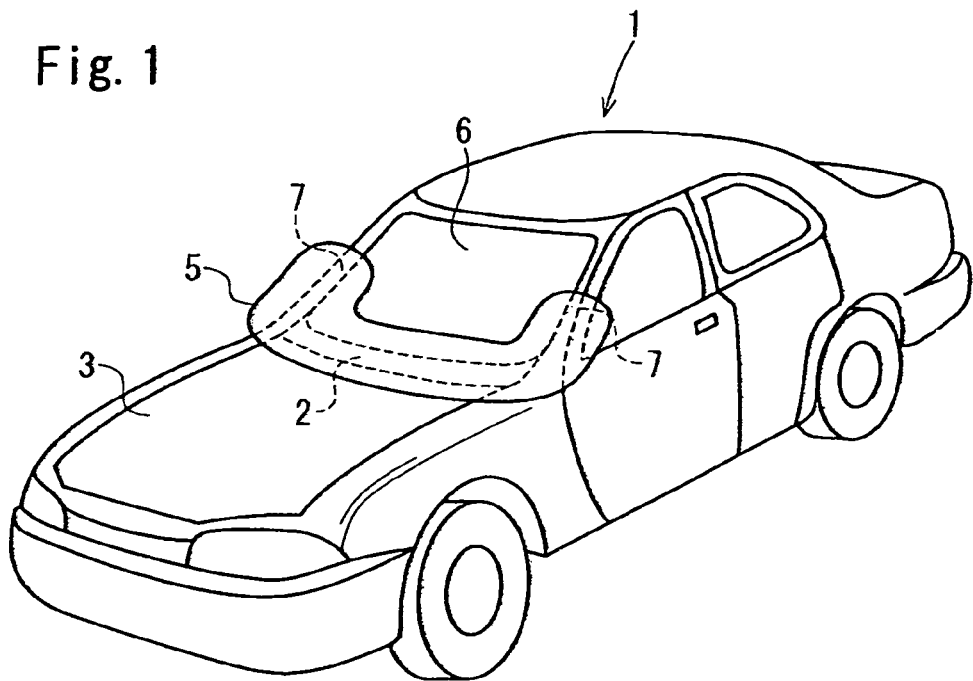
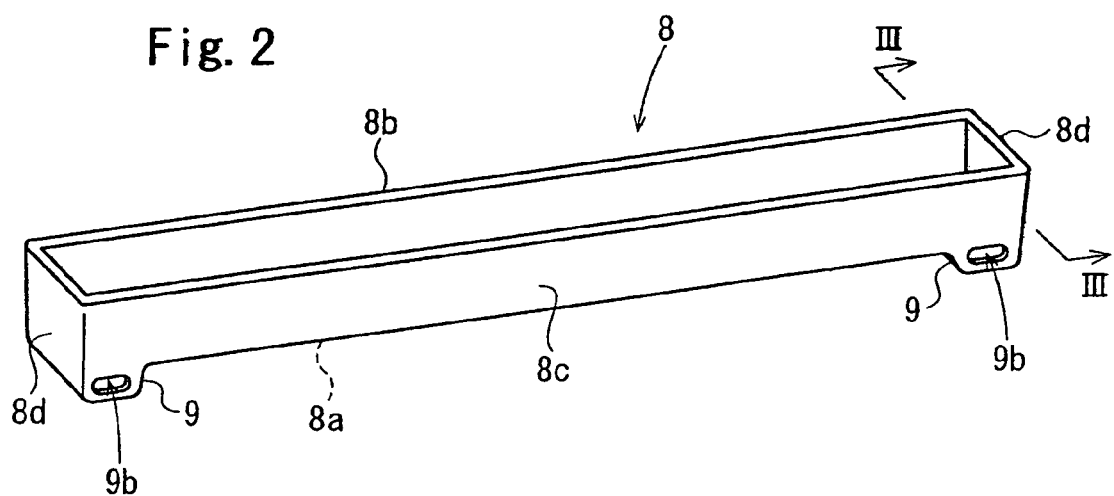

AIRBAG DEVICE FOR PEDESTRIAN

TECHNICAL FIELD

The present invention relates to an airbag device for pedestrian, which is structured to inflate an airbag along an outer surface of an automobile body around a cowl to protect a pedestrian (a pedestrian or a bike rider).

BACKGROUND ART

Generally in an airbag device for pedestrian structured to protect a pedestrian (a pedestrian or a bike rider) by inflating an airbag along the outer surface of the automobile body around the cowl, the airbag stored in a case is disposed around the cowl. A water discharge hole (drain hole) is formed in the bottom of the case to drain water such as rain water intruded into the case (see FIG. 3 in Japanese Unexamined Patent Application Publication No. 2005-178587).

[Patent Document 1] Japanese Unexamined Patent Application Publication No. 2005-178587

In the airbag device for pedestrian as disclosed in Japanese Unexamined Patent Application Publication No. 2005-178587, water drained from the case through the drain hole will flow into the engine room, which may adversely influence the apparatus and device, especially electric components in the engine room.

SUMMARY OF THE INVENTION

The present invention provide an airbag device for pedestrian, which is structured to drain water in the case to the cowl.

Means for Solving the Problems

The present invention provides an airbag device for pedestrian with an airbag which inflates along an outer surface of an automobile body around a cowl, a case for storing the airbag, and an inflator which inflates the airbag. A drain passage for draining water which has intruded into the case to a cowl is provided.

The airbag device for pedestrian according to the present invention allows water which has intruded into the case to be drained to the cowl through the drain passage without entering into the engine compartment. This makes it possible to protect the apparatus and device inside the engine compartment from being in contact with the drained water from the case.

The airbag device for pedestrian according to the present invention may be provided with the guide passage for introducing water which has intruded to the front of the case in the region below the hood of the automobile body. In the structure, water which has intruded in the region below the hood to the front of the case may be drained to the cowl via the case and the drain passage, thus preventing the apparatus and device within the engine room from being in contact with the drain water.

BRIEF DESCRIPTION OF THE DRAWINGS

FIG. 1 is a perspective view of an automobile equipped with an airbag device for pedestrian according to an embodiment.

FIG. 2 is a perspective view of a case for storing an airbag.

DETAILED DESCRIPTION

Figure 3:
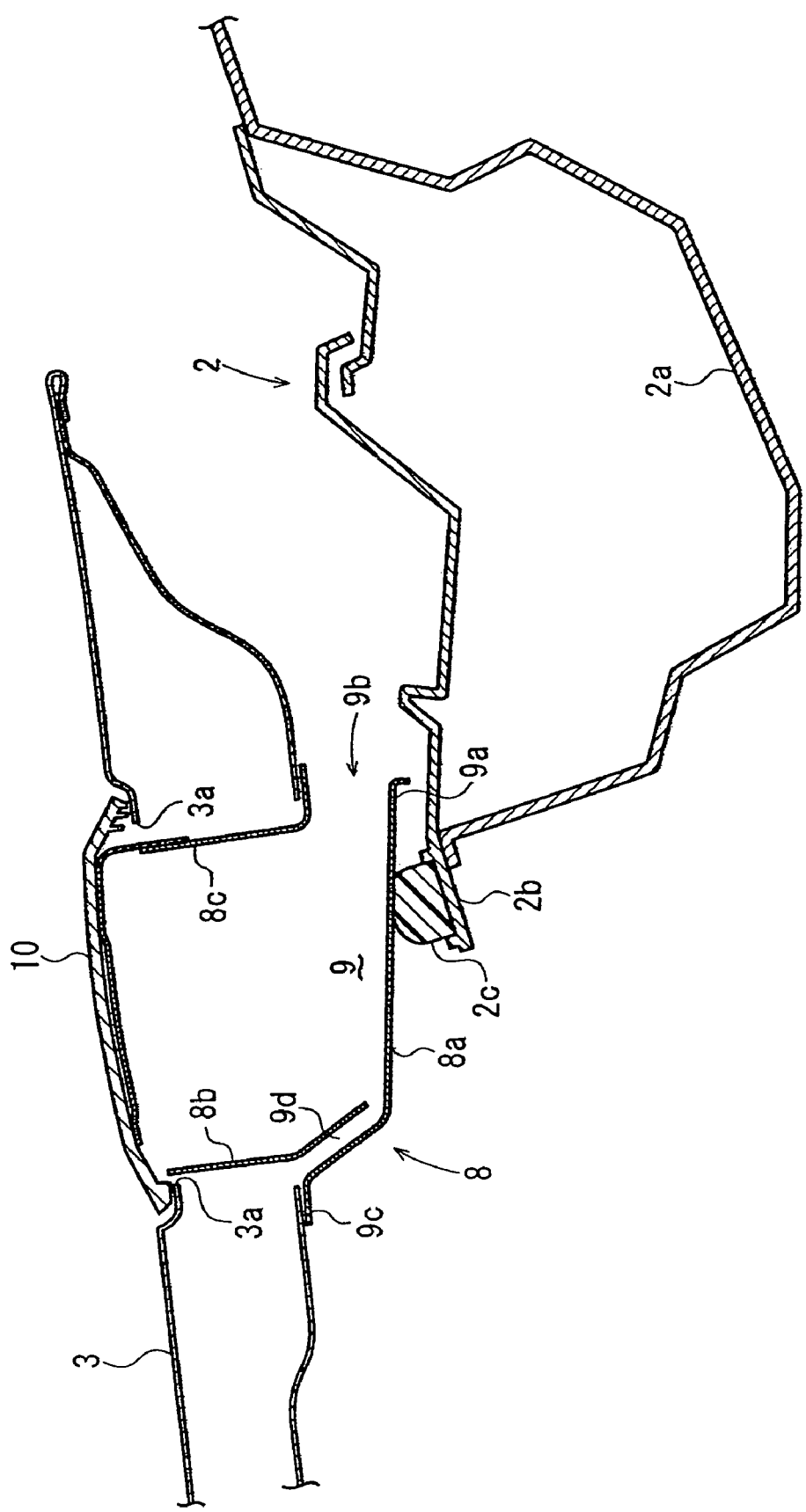
FIG. 3 is a sectional view of the automobile taken along line III-III shown in FIG. 2.

An embodiment of the present invention will be described referring to the drawings. FIG. 1 is a perspective view of an automobile equipped with an airbag device for pedestrian according to an example. FIG. 2 is a perspective view of an airbag storage case of the airbag device for pedestrian. FIG. 3 is an enlarged sectional view taken along line III-III shown in FIG. 2.

Referring to FIG. 1, an automobile 1 is of a four-door sedan model in the embodiment. However, the present invention is not limited to the vehicle of specific model. An airbag device for pedestrian is installed to the rear portion of a hood 3. As shown in the drawing, when an airbag 5 of the airbag device for pedestrian inflates, a rear edge of the hood 3, a cowl louver 2, and at least a portion of a windshield 6 and left and right A pillars 7 are covered with the airbag 5.

The airbag device for pedestrian includes a case 8 for storing the airbag 5 in the folded state, an inflator (not shown) for inflating the airbag 5, and a lid 10 for closing an opening 3a of the hood 3, which allows passage of the airbag. In the embodiment, the inflator is stored in the case 8 together with the folded airbag 5.

The case 8 is a long box-like shape extending in a width direction of the automobile. The case 8 having an open top surface includes a bottom portion 8a, a front wall portion 8b, a rear wall portion 8c, and left and right end walls 8d, 8d. The case 8 is disposed at a back side of the hood 3 to allow the open top surface to face the opening 3a, and attached to the hood 3 via a bracket (not shown).

The case 8 is structured to have the height of the upper surface of the bottom portion 8a lower toward both ends in the lateral direction. Referring to FIG. 3, a drain passage 9 for draining water from inside to outside the case 8 is formed at both ends of the bottom portion 8a in the lateral direction. The drain passage 9 has a descending slope surface toward the rear of the automobile. Each duct-like portion 9a (not shown in FIG. 2) protrudes at each left and right end of the rear wall portion 8c of the case 8 as an extension of the drain passage 9 to the rear of the automobile. A drain hole 9b is formed at the leading end of each of the duct-like portions 9a.

In the embodiment, a water receiving flange 9c protrudes from the front wall portion 8b of the case 8 to the front of the automobile as shown in FIG. 3. A guide passage 9d communicated from the upper surface of the water receiving flange 9c to the inside of the case 8 is formed at the proximal end side of the water receiving flange 9c. As a result, water which has intruded into the front area of the case 8 from the opening 3a (water dropped onto the flange 9c, and water which has dropped along the front surface of the front wall portion 8b) is introduced from the guide passage 9d into the case 8, and then guided to the drain passage 9.

The cowl louver 2 with a gutter-like member extending in the width direction of the automobile body is structured to guide water flowing thereon to the drain section (not shown) at both sides of the automobile body. A long box-like cowl body 2a extending in the width direction of the automobile body is disposed below the cowl louver 2. A wiper device (not shown) is stored in the cowl body 2a.

Referring to FIG. 3, the case 8 is structured to be mounted on a front portion 2b of the cowl louver 2 when closing the hood 3. A reference code 2c denotes a packing for sealing the gap between the cowl louver 2 and the case 8.

A lid 10 at the rear edge of the automobile body is hinged (not shown) thereto at the rear edge of the opening 3a of the hood 3 so as to open while turning rearward upon inflation of the airbag 5. The front edge side of the lid 10 is attached to the automobile body at the front edge side of the opening 3a with a fixture member (not shown) such as a clip. The fixture member is structured to release a lock state when the lid 10 is pushed by the airbag 5 and opened.

In the thus structured airbag device for pedestrian, water which has intruded in the case 8 is drained onto the cowl louver 2 via the drain passage 9, the duct-like portion 9a and the drain hole 9b, and accordingly, it is not allowed to enter into the engine compartment. This makes it possible to prevent the contact between the apparatus and device within the engine and the drain water.

In the embodiment, water which has intruded into the area below the hood to the front of the case 8 may be introduced from the guide passage 9d into the case 8, and drained onto the cowl louver 2 via the drain passage 9. The contact between the apparatus and device within the engine room and the drain water may be prevented.

The operation of the airbag device for pedestrian will be described hereinafter.

In the case where a pedestrian is hit by an automobile equipped with the airbag device for pedestrian, the inflator is activated based on the detection signal of a pedestrian collision detection sensor (not shown) installed in the automobile body. The airbag 5 starts inflating by the injected gas. The lid 10 is pushed by the inflating airbag 5 and then opened such that the airbag 5 deploys along the outer surface of the automobile body as shown in FIG. 1.

Figure 4A:
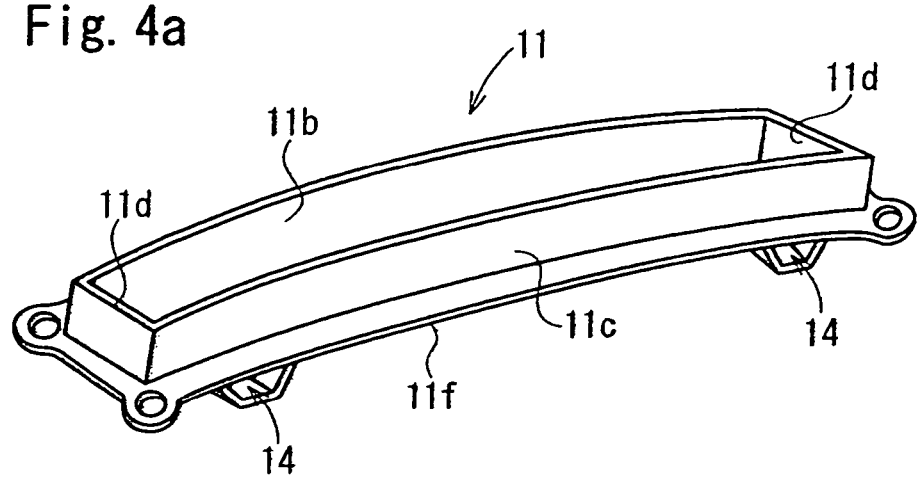
FIG. 4a is a perspective view of the case for storing the airbag of the airbag device for pedestrian according to another example.
Figure 4B:
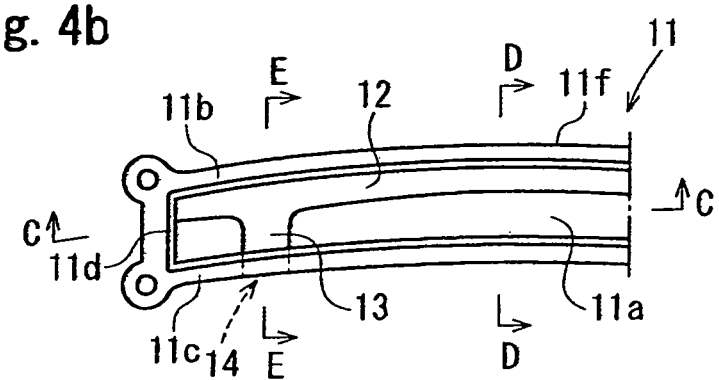
FIG. 4b is a plan view of the case.
Figure 4C:
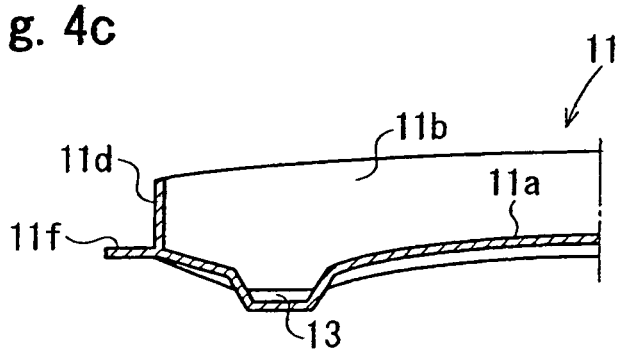
FIGS. 4c, 4d, and 4e are sectional views taken along lines C-C, D-D, and E-E shown in FIG. 4b, respectively.
Figure 4D:
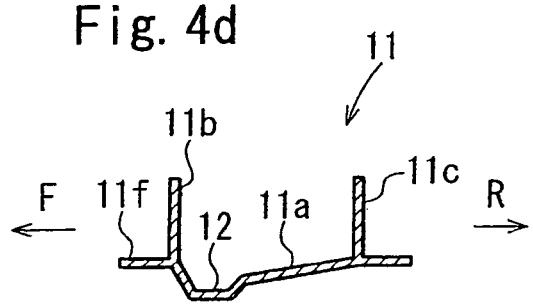
Figure 4E:
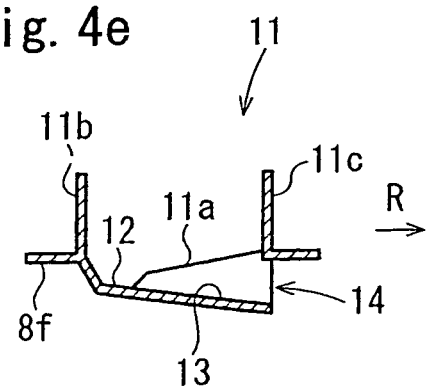

FIG. 4a is a perspective view of the airbag storage case of the airbag device for pedestrian according to another embodiment. FIG. 4b is a plan view of the case. FIGS. 4c, 4d and 4e are sectional views taken along lines C-C, D-D, and E-E, respectively shown in FIG. 4b. In FIGS. 4d and 4e, an arrow direction F denotes the front side of the vehicle, and an arrow direction R denotes the rear side of the vehicle.

An airbag storage case 11 in the embodiment with a long box-like shape extending in the width (lateral) direction of the automobile includes a bottom portion 11a, a front wall portion 11b, a rear wall portion 11c, and left and right end walls 11d, 11d, having an open top surface. A reference code 11f denotes a flange portion which protrudes from (provided along) the outer surface of the case 11. An insertion hole (code is omitted) through which the bolt or rivet for fixing the case 11 to the automobile body is inserted is formed in the flange portion 11f.

Referring to FIG. 4d, the bottom portion 11a has a descending slope surface toward the front side of the automobile (the arrow F direction). A water collection groove 12 extending along the longitudinal direction of the case 11 is formed at the front edge side. Water on the bottom portion 11a drops forward of the automobile so as to be collected in the water collection groove 12 which extends along substantially the entire length of the case 11 in the longitudinal direction.

In the example, drain passages 13, 13 for draining water in the water collection groove 12 outside the case 11 are formed at positions of the bottom portion 11a apart from the respective ends of the case 11 in the longitudinal direction toward the center each by a predetermined distance. Referring to FIG. 4b, the drain passage 13 extends from the front to the rear of the case 11. The drain passage 13 at the front end side joins the water collection groove 12, and the one at the rear end side is communicated with outside the case 11 via the drain hole 14 formed in the rear wall portion 11c. Referring to FIG. 4c, the drain passage 13 has a descending slope surface toward the rear side (arrow R direction) of the automobile.

As FIG. 4c shows, each level of the bottom portion 11a and the water collection groove 12 becomes lower from the center of the case 11 toward the drain passage 13, and from both ends of the case 11 toward the drain passage 13, respectively.

In the example, the inflator is fixed (not shown) at the portion around the corner where the bottom portion 11a intersects the front wall portion 11b. The inflator is arranged higher than the water collection groove 12 by a predetermined height so as to at least prevent the initiator (ignition device) from being immersed in water.

The other structure of the embodiment is the same as that of the embodiment shown in FIGS. 1 to 3.

Figure 5A:
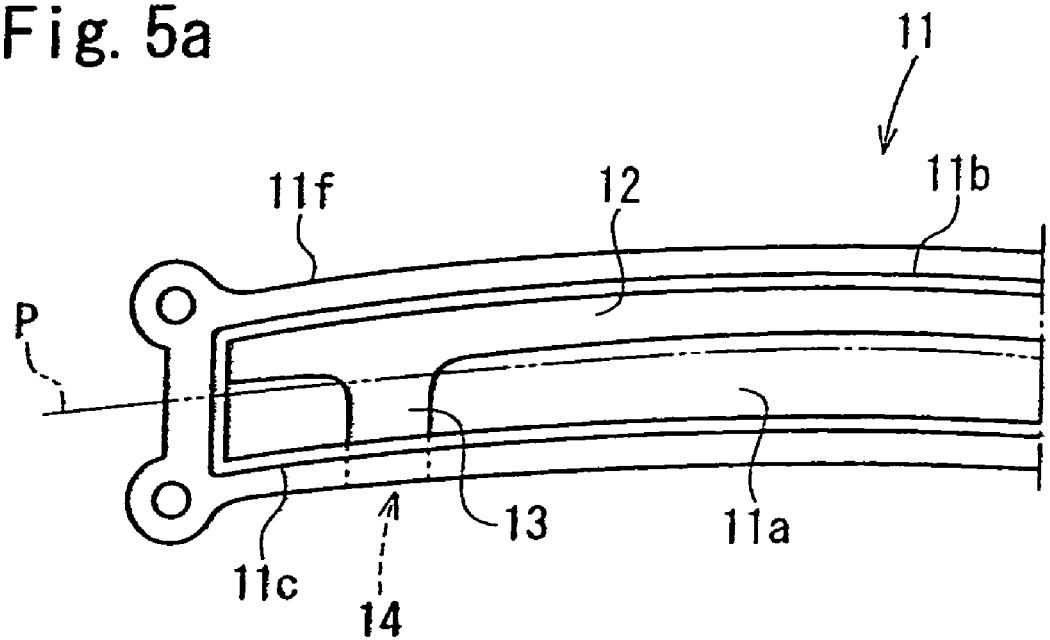
FIGS. 5a and 5b are plan views each showing an example of an arrangement of a packing for sealing a joint portion between the case and a cowl member.
Figure 5B:
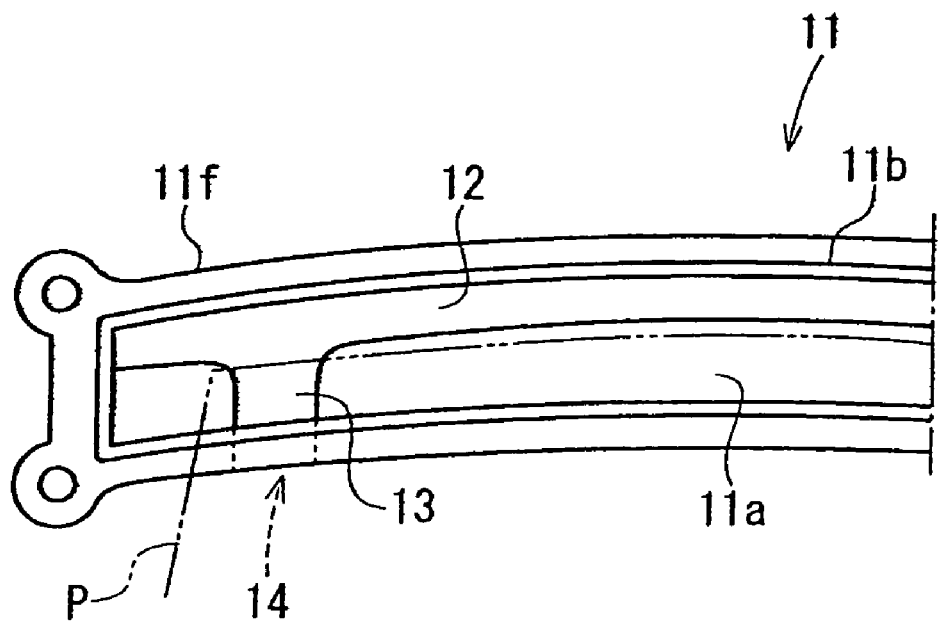

The arrangement of the packing for sealing the joint portion between the case and the cowl member is not limited. FIGS. 5a and 5b show examples of the packing arrangement when the case 11 is employed, respectively. The packing is shown by a chain double-dashed line in FIGS. 5a and 5b.

More specifically, in FIG. 5a, a packing P extends substantially linearly from one end to the other end in the longitudinal direction of the case across the lower surface of the bottom portion 11a.

Referring to FIG. 5b, both ends of the packing extending across the lower surface of the bottom portion 11a are directed to the rear of the automobile each at the position before the end of the case 11 (around the drain passage 13) outward (sideward) of the drain passage 13.

The packing may be provided in the arbitrary arrangement other than the one as described above.

The respective embodiments show examples of the present invention, and are not limited thereto.

In the aforementioned embodiments, the drain passages (drain holes) are formed at both left and right ends of the case. However, they may be disposed at the portion other than the one as described above, for example, at an arbitrary position or the intermediate position of the case in the lateral direction.

The airbag device for pedestrian according to the embodiments includes only one airbag. However, it is allowed to have a plurality of airbags.

The case may be divided into a plurality of chambers. In this case, the drain passage may be formed in each of the chambers. Alternatively, the drain passage may be formed astride the plurality of chambers.

The present invention has been described in accordance with the specific example. It is to be understood that the present invention may be changed or modified into various forms without departing from the scope of the present invention.

The present invention is based on the disclosure of Japanese Patent Application No. 2006-16322 filed on Jan. 25, 2006, and incorporated herein by reference in its entirety.

The invention claimed is:

1. An airbag device for pedestrian, comprising:
   an airbag which inflates along an outer surface of an automobile body around a cowl,
   an inflator which inflates the airbag, and
   an elongated case for storing the airbag, said case extending in a width direction of the automobile body and having two side areas in the width direction, and drain passages for draining water which has intruded into the case to a cowl, each of said drain passages being formed at each of the two side areas and having a duct with a drain hole extending to a rear of the automobile body wherein the duct protrudes rearwardly from a rear end wall of the case as an extension and has a descending slope surface descending toward the rear of the automobile.

2. The airbag device for pedestrian according to claim 1, further comprising a guide passage for guiding water which has intruded to a front side of the case below a hood of the automobile body, into the drain passages of the case.

3. The airbag device for pedestrian according to claim 1, wherein the case has an open top surface, and includes a bottom portion, a front wall portion, a rear wall portion, and left and right end walls.

4. The airbag device for pedestrian according to claim 3, wherein
   the case installed in the automobile body is structured to have a top surface of the bottom portion lowered toward each end of the automobile body in the width direction; and
   the drain passages are formed at both ends of the bottom portion in the width direction.

5. The airbag device for pedestrian according to claim 3, wherein:
   a water collection groove is formed in the bottom portion of the case to extend in a longitudinal direction of the case; and
   the drain passages are communicated with the water collection groove.

6. A combination comprising:
   the airbag device according to claim 1, and
   an automobile including an engine compartment, a hood for covering the engine compartment, and a cowl louver covering the cowl,
   wherein the case is attached to the hood such that the ducts are located above the cowl louver when the hood is closed, to prevent water from entering the engine compartment from the case.

* * * * *